United States Patent
Jensen et al.

[11] Patent Number: 6,131,962
[45] Date of Patent: Oct. 17, 2000

[54] CORE SPRAY LINE COUPLING APPARATUS AND METHODS

[75] Inventors: Grant Clark Jensen, Morgan Hill; Jeffrey Lee Thompson, San Jose, both of Calif.

[73] Assignee: General Electric Company, Schenectady, N.Y.

[21] Appl. No.: 09/015,429

[22] Filed: Jan. 29, 1998

[51] Int. Cl.$^7$ ........................................ F16L 17/00
[52] U.S. Cl. ........................ 285/337; 285/905; 376/282
[58] Field of Search ............................ 285/148.1, 148.6, 285/179, 412, 180, 337, 374, 378, 905, 148.28, 119; 376/282; 403/30

[56] References Cited

U.S. PATENT DOCUMENTS

| | | | |
|---|---|---|---|
| 683,024 | 9/1901 | Dunn | 285/337 |
| 1,671,789 | 5/1928 | Smith | 285/179 X |
| 1,731,761 | 10/1929 | Bulmahn | 285/337 X |
| 4,721,330 | 1/1988 | Woodhouse | 285/337 X |
| 4,762,330 | 8/1988 | Lonne et al. | 285/412 X |
| 5,228,795 | 7/1993 | Gray | 403/30 |
| 5,466,107 | 11/1995 | Percival-Smith | 411/546 |
| 5,735,551 | 4/1998 | Whitman et al. | 285/179 X |
| 5,912,936 | 6/1999 | Charnley et al. | 376/282 |
| 5,924,744 | 7/1999 | Eberle | 285/179 X |
| 5,947,529 | 9/1999 | Jensen | 376/282 X |

*Primary Examiner*—Lynne H. Browne
*Assistant Examiner*—Greg Binda
*Attorney, Agent, or Firm*—Armstrong Teasdale LLP

[57] ABSTRACT

Coupling apparatus and methods for replacing a core spray line downcomer pipe coupled to a shroud T-box are described. In one embodiment, the coupling apparatus includes a seal ring, a mating flange, a housing, at least one coupling bolt, at least one spherical washer, and at least one lateral pin. The thermal expansion coefficient of the coupling bolt is lower than the thermal expansion coefficient of the seal ring, mating flange, and housing. After extending the downcomer pipe into the housing, the seal ring is inserted into the opposite end of the housing adjacent the downcomer pipe. The seal ring is then seated on the mating flange seat. The two seats allow the downcomer pipe to be rotational misaligned with the coupling apparatus. The coupling bolts extend through the mating flange and the housing to rigidly secure the downcomer pipe to the coupling apparatus. Lateral pins extend through the housing and the downcomer pipe to provide vertical and torsional load transfer from the downcomer pipe to the coupling apparatus. In addition, the coupling apparatus includes a cylindrical pipe, an elbow, a draw bolt, an anchor plate, and a block. The elbow is configured to receive the T-box extending from the shroud. In one embodiment, the draw bolt bolts extend through the anchor plate, the T-box, the elbow, and the block to secure the coupling apparatus to the shroud.

19 Claims, 3 Drawing Sheets

CORE SPRAY LINE COUPLING APPARATUS AND METHODS

FIELD OF THE INVENTION

This invention relates generally to nuclear reactors and more particularly, to apparatus and methods for coupling piping within reactor pressure vessels of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as T-boxes and core spray line downcomers, occasionally require replacement as a result of SCC. Replacing the core spray piping often requires removing and replacing the core spray line downcomer. The core spray line downcomer attachment to the shroud core spray sparger T-box, however, typically is installed during original reactor construction and is difficult to access. In addition, replacing the core spray line downcomer is complicated by the limited available working space.

The core spray line downcomer includes a lower elbow secured to a shroud penetration thermal sleeve. Installing a replacement downcomer pipe, as originally designed, into the reactor requires that the replacement lower elbow be welded to the shroud. However, as explained above, it is difficult to access this area of the reactor.

It would be desirable to provide an apparatus which facilitates replacing a core spray line downcomer attached to the shroud core spray sparger T-box. It would also be desirable to provide such an apparatus which is installed without the necessity of field welding.

SUMMARY OF THE INVENTION

Replacement of a downcomer pipe without field welding may be attained by a coupling apparatus which, in one embodiment, includes a ring shaped seal ring secured between a mating flange and a housing using four coupling bolts. The seal ring has a spherical convex seat. The mating flange includes a spherical concave seat for receiving the seal ring convex seat and a substantially cylindrical pipe opening.

The housing includes a substantially cylindrical seal ring engaging portion for receiving a portion of the seal ring and a substantially cylindrical pipe opening having an inner diameter sized to receive the downcomer pipe. The housing also includes two lateral pin openings sized to receive lateral pins. The lateral pins extend through aligned respective housing lateral pin openings and into tapered lateral pin openings machined into the downcomer pipe. The seal ring seat seats on the mating flange and the four coupling bolts extend between and secure the mating flange to the housing. The convex and concave seats allow the downcomer pipe to be rotationally misaligned with the coupling apparatus.

The coupling apparatus further includes a substantially cylindrical pipe connected to the mating flange pipe opening and an elbow connected to the second end of the pipe. The elbow includes a substantially circular shaped lower flange and a T-box opening having an inner diameter sized to receive a portion of a T-box extending from the shroud.

Additionally, the coupling apparatus includes an anchor plate, a block, and a draw bolt. The substantially circular anchor plate includes a draw bolt opening and is sized to be placed inside the shroud adjacent the T-box. The substantially wedge shaped block includes a draw bolt opening and is sized to be placed adjacent the elbow. The draw bolt extends through the anchor plate opening, a T-box draw bolt opening, an elbow draw bolt opening, and the block draw bolt opening to secure the elbow to the shroud.

To install the coupling apparatus, a lower portion of the existing downcomer pipe is removed, for example, by cutting-off a portion of the downcomer pipe near the lower elbow and removing the lower elbow from the shroud. Draw bolt openings are then machined in the T-box and the elbow. Similarly, two lateral pin openings are machined in the downcomer pipe. After inserting the seal ring into the housing engaging portion, the downcomer pipe is extended into the housing until the downcomer pipe is adjacent to the seal ring. The seal ring convex seat is then seated on the mating flange concave seat, and the mating flange is coupled to the housing using the four coupling bolts. The downcomer pipe is then secured to the coupling apparatus using two lateral pins.

Before fully securing the coupling bolts, the coupling apparatus is coupled to the shroud. Specifically, the elbow is placed adjacent to the shroud so that the T-box extends into the elbow T-box opening. The coupling apparatus draw bolt is then extended through anchor plate, T-box, and elbow draw bolt openings. After extending the block over the draw bolt, the draw bolt is secured so that the elbow is coupled to the shroud. The resulting connection provides a fluid passage from the downcomer pipe to the T-box while allowing rotational misalignment between the downcomer pipe and the coupling apparatus.

The above-described apparatus facilitates replacing a lower portion of a downcomer pipe. The coupling apparatus is bolted to the shroud and the downcomer pipe therefore avoiding field welding in the limited space surrounding the downcomer pipe. Additionally, the resulting connection between the downcomer pipe and the shroud T-box is a permanent replacement.

DETAILED DESCRIPTION

Figure 1:
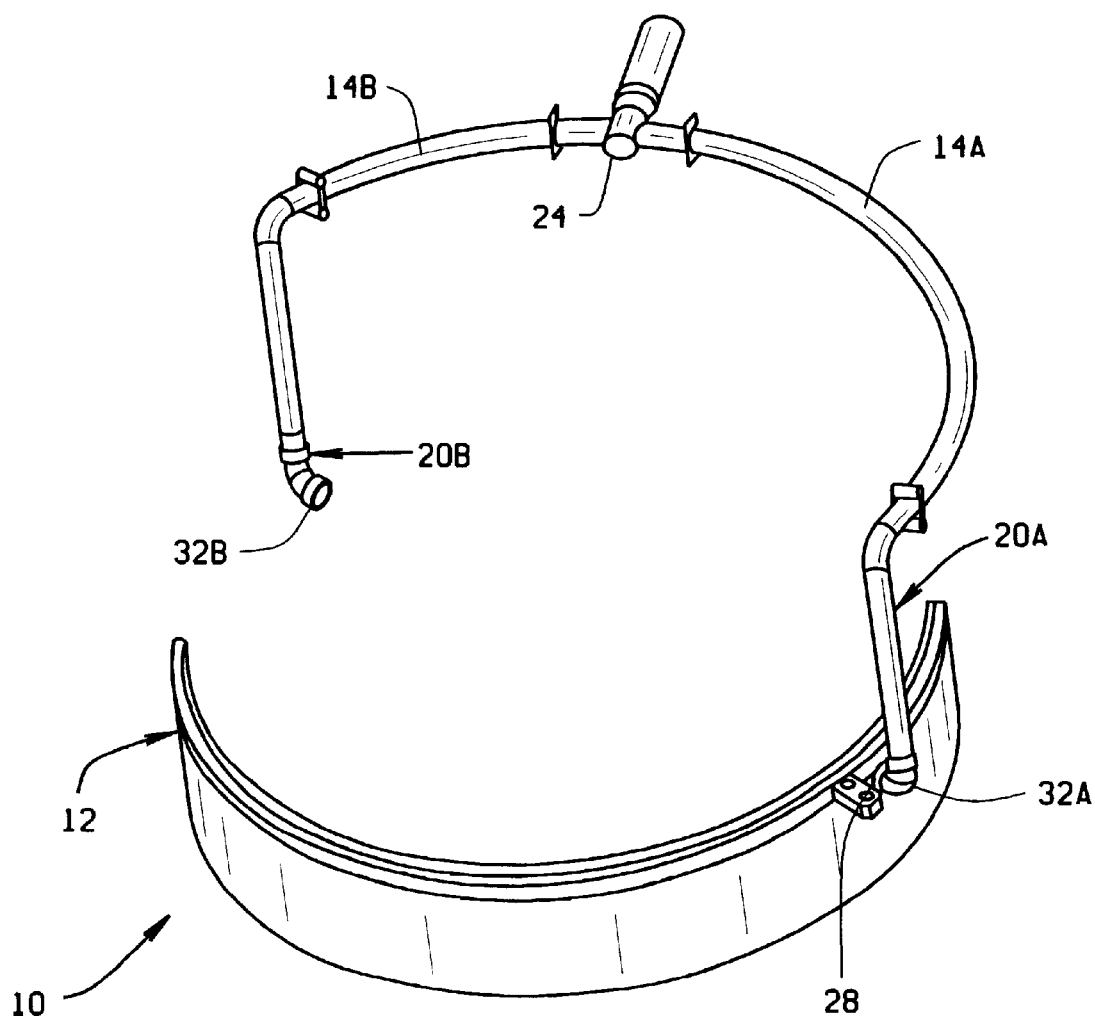
FIG. 1 is a perspective view with parts cut away of a reactor pressure vessel.

FIG. 1 is a perspective view with parts cut away of a reactor pressure vessel (RPV) 10. RPV 10 includes a shroud 12, core spray line laterals 14A and 14B, downcomer pipes 20A and 20B, a T-box junction 24, a T-box 28, and core spray spargers (not shown in FIG. 1). Downcomer pipes 20A and 20B include a lower elbow 32A and 32B. Lower elbows 32A and 32B are typically welded to shroud 12. Replacing downcomer pipes 20A and 20B is complicated because of the limited accessibility of lower elbows 32A and 32B. The limited accessibility makes welding of replacement downcomer pipes difficult.

Figure 2:
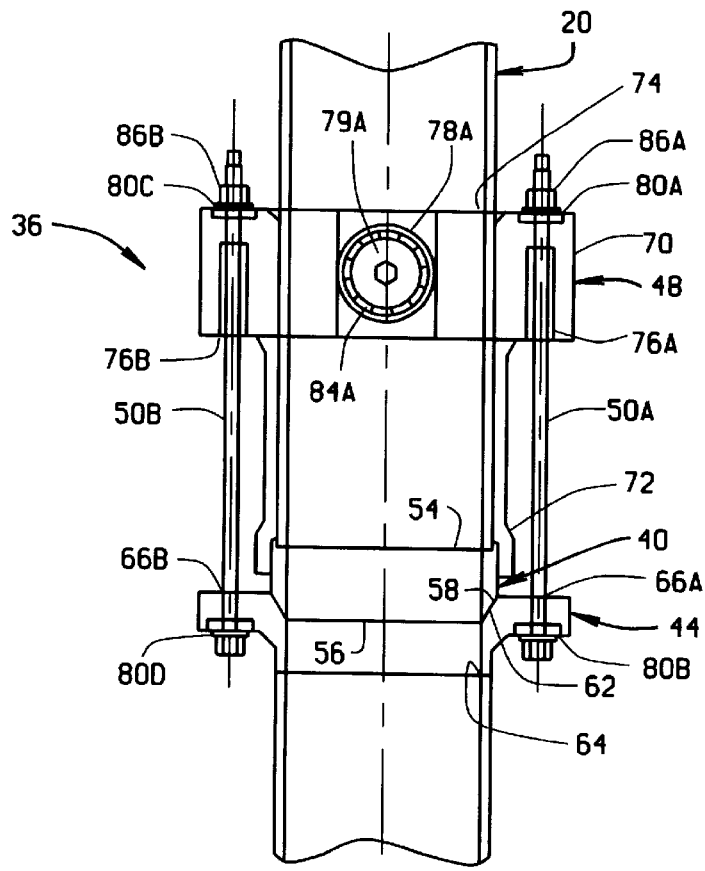
FIG. 2 is a side view with parts cut away of a coupling apparatus in accordance with one embodiment of the present invention.
Figure 3:
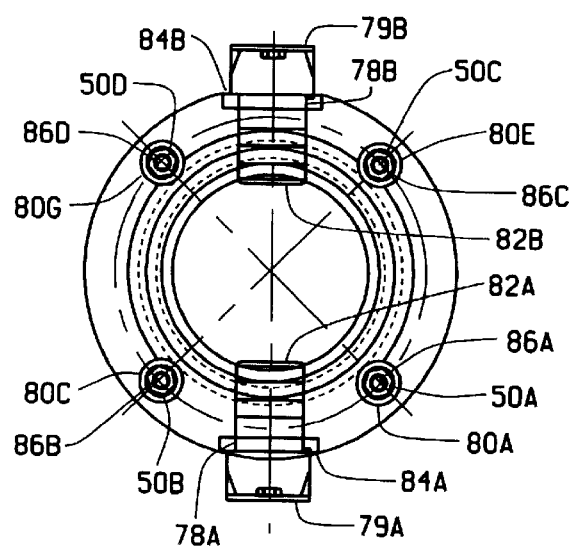
FIG. 3 is a top view with parts cut away of the housing shown in FIG. 2.

Referring to FIGS. 2 and 3, a coupling apparatus 36 includes a ring shaped seal ring 40 secured between a mating flange 44 and a housing 48 using four coupling bolts 50A, 50B, 50C, and 50D. Seal ring 40 includes a first surface 54 and a second surface 56 having a spherical convex seat 58. Mating flange 44 includes a spherical concave seat 62, a substantially cylindrical pipe opening 64, and four slotted coupling bolt openings 66A, 66B, 66C, and 66D sized to receive coupling bolts 50A, 50B, 50C, and 50D. Spherical seat 62 is sized to receive seal ring seat 58 for accommodating misalignment of downcomer pipe 20A and mating flange 44. Coupling bolts 50A, 50B, 50C, and 50D share load and prevent eccentric loading.

Housing 48 includes a housing flange 70 and a substantially cylindrical seal ring engaging portion 72 extending from housing flange 70. Housing flange 70 also includes a substantially cylindrical pipe opening 74 and four coupling bolt openings 76A, 76B, 76C, and 76D (only two shown) sized to receive coupling bolts 50A, 50B, 50C, and 50D. The inner diameter of pipe opening 74 is sized to receive downcomer pipe 20A. Housing engaging portion 72 is sized to receive a portion of seal ring 40 so that seal ring seat 58 seats on mating flange seat 62 when mating flange 44 is coupled to housing 48. Two lateral pins 79A and 79B are sized to extend through aligned respective housing lateral pin openings 78A and 78B and tapered lateral pin openings 82A and 82B machined in downcomer pipe 20A. Lateral pins 79A and 79B equally distribute axial loading and are secured to housing 48 with respective crimp nuts 84A and 84B.

Coupling bolts 50A, 50B, 50C, and 50D are sized to extend between mating flange 44 and housing 48 and each include two spherical washers 80A, 80B, 80C, 80D, 80E, 80F, 80G, and 80H (washers 80F and 80H not shown) and crimp nuts 86A, 86B, 86C, and 86D. Spherical washers 80A, 80B, 80C, 80D, 80E, 80F, 80G, and 80H provide a parallel surface for heads of coupling bolts 50A, 50B, 50C, and 50D and nuts 86A, 86B, 86C, and 86D.

Figure 4:
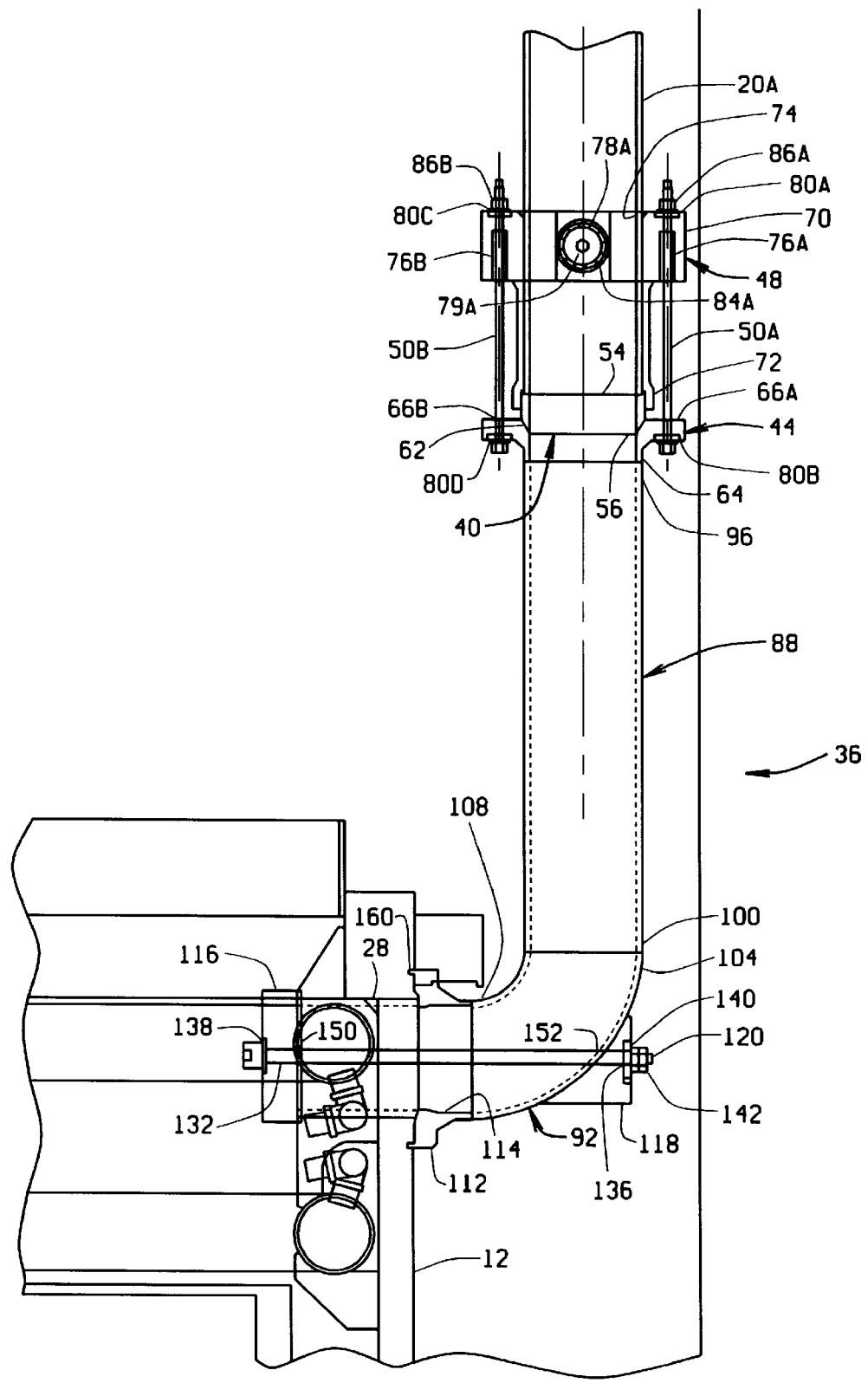
FIG. 4 is a side view with parts cut away in accordance with one embodiment of the present invention.

Additionally, as shown in FIG. 4, coupling apparatus 36 includes a substantially cylindrical pipe 88 and an elbow 92. Pipe 88 includes a first end 96 coupled to mating flange pipe opening 64 and a second end 100 coupled to an elbow first end 104. An elbow second end 108 includes a lower flange 112 and a T-box opening 114 having an inner diameter sized to receive a portion of T-box 28 extending from shroud 12.

Coupling apparatus 36 further includes an anchor plate 116, a block 118, and a draw bolt 120. Circular shaped anchor plate 116 includes a draw bolt opening 132 and is sized to be placed inside shroud 12 adjacent T-box 28. Wedge shaped block 118 includes a draw bolt opening 136 and is attached to elbow 92. Anchor plate 116 and block 118 each include spherical surfaces 138 and 140 adjacent respective openings 132 and 136. Draw bolt 120 sized to extend through anchor plate opening 132, a T-box draw bolt opening 150, an elbow draw bolt opening 152, and block draw bolt opening 136. Draw bolt 120 is threaded and configured to clamp elbow 92 to shroud 12 using anchor plate 116 and block 118. A nut 142 threadedly engages draw bolt 120 and engages spherical surface 140 as secured. Head of draw bolt 120 and nut 142 bear on respective spherical surfaces 138 and 140 to alleviate bending of draw bolt 120.

Coupling bolts 50A, 50B, 50C, and 50D, and spherical washers 80A, 80B, 80C, 80D, 80E, 80F, 80G, and 80H may, for example, be fabricated from X-750. Draw bolt 120 may, for example, be fabricated from X-750 or XM-19 for strength. All other components of coupling apparatus 36, including seal ring 40, mating flange 44, housing 48, and crimp nuts 86A, 86B, 86C, and 86D may, for example, be fabricated from low carbon 304 or 316 stainless steel. In accordance with one embodiment of the present invention, draw bolt 120 and coupling bolts 50A, 50B, 50C, and 50D are fabricated from a material, for example, X-750, which has a lower thermal expansion coefficient than the type 304 or 316 stainless steel. As a result of the lower thermal expansion coefficient, tension of bolts 120, 50A, 50B, 50C, and 50D is increased as the reactor heats up ensuring leak resistant joints.

In replacing the lower portion of downcomer pipe 20A, including lower elbow 32A, downcomer pipe 20A is cut-off between core spray line lateral 14A and lower elbow 32A. Lower elbow 32A is then removed from shroud T-box 28. Circular groove 160 is formed in shroud 12 and draw bolt opening 150 is formed in T-box 28, typically by electrical discharge machining. Groove 160 is sized to receive lower flange 112 so that elbow 92 is secured adjacent to shroud 12. After downcomer pipe 20A is trimmed square and machined round, tapered lateral pin openings 78A and 78B are formed, typically by electrical discharge machining, near the end of downcomer pipe 20A to be coupled with coupling apparatus 36, more particularly, lateral pins 79A and 79B.

After inserting seal ring 40 into housing engaging portion 72, downcomer pipe 20A is inserted into housing 48 until adjacent to seal ring 40. Mating flange 44 is then positioned adjacent seal ring 40 so that seal ring seat 58 seats on spherical seat 62. After placing spherical washers 80B, 80D, 80F, and 80H over respective coupling bolts 50A, 50B, 50C, and 50D, coupling bolts 50A, 50B, 50C, and 50D are extended through mating flange coupling bolt openings 66A, 66B, 66C, and 66D and aligned housing coupling bolt openings 76A, 76B, 76C, and 76D. Slotted openings 66A, 66B, 66C, and 66D accommodate rotational misalignment between an axis of lateral pins 79A and 79B and a tangent point, or contact surface of shroud 12. Spherical washers 80A, 80C, 80E, and 80G are then placed over respective coupling bolts 50A, 50B, 50C, and 50D adjacent to housing 48 and crimp nuts 86A, 86B, 86C, and 86D are threadedly engaged to coupling bolts 50A, 50B, 50C, and 50D.

Elbow 92 is then positioned so that T-box 28 is received by elbow T-box opening 114 and lower flange 112 extends into groove 160. Draw bolt 120 is then extended through anchor plate opening 132, T-box opening 150, and elbow opening 152. After inserting draw bolt 120 into block 118, nut 142 is threadedly engaged to draw bolt 120 and secured against spherical surface 140 causing coupling apparatus elbow 92 to be placed adjacent to shroud 12 and securing lower flange 112 to groove 160.

Lateral pins 79A and 79B are then extended through housing lateral pin openings 78A and 78B and aligned downcomer pipe lateral pin openings 82A and 82B. As lateral pins 79A and 79B are torqued, pins 79A and 79B provide load transfer from downcomer pipe 20A to housing 48. Load path is through downcomer pipe 20A, lateral pins 79A and 79B into housing 48, into seal ring 40, into flange 44 and coupling bolts 50A, 50B, 50C, and 50D and back into housing 48. Lateral pins 79A and 79B are secured using crimp nuts 84A and 84B. Nuts 86A, 86B, 86C, and 86D are then torqued clamping seal ring 40 between housing 48 and mating flange 44 forming a rigid joint between coupling apparatus 36 and downcomer pipe 20A.

The resulting connection provides a fluid passage from downcomer pipe 20A to T-box 28 while allowing rotational misalignment of downcomer pipe 20A and coupling apparatus pipe 88. Additionally, coupling apparatus 36 facilitates replacing downcomer pipe 20A without the necessity of field welding.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A coupling apparatus for coupling a downcomer pipe of a core spray line to a core shroud in a nuclear reactor, the downcomer pipe including at least one lateral pin opening, the core shroud including a T-box having a draw bolt opening, said apparatus comprising:
    a seal ring having a first seat;
    a mating flange having a second seat configured to receive said first seat of said seal ring; and
    a housing for securing said first seat on said second seat, said housing comprising a substantially cylindrical pipe opening configured to receive a downcommer pipe, at least one lateral pin opening configured to substantially align with a corresponding downcomer pipe lateral pin opening, and an engaging portion for receiving said seal ring, said seal ring positioned between said mating flange and said engaging portion of said housing, said housing further comprising at least one lateral pin extending through said lateral pin opening and configured to extend through and engage the downcommer pipe lateral pin opening.

2. A coupling apparatus in accordance with claim 1 wherein said housing and said mating flange each have at least one coupling bolt opening, and wherein said apparatus further comprises at least one coupling bolt configured to extend through said coupling bolt openings when aligned.

3. A coupling apparatus in accordance with claim 2 wherein said mating flange bolt opening is slotted.

4. A coupling apparatus in accordance with claim 2 further comprising at least one spherical washer configured to receive said coupling bolt.

5. A coupling apparatus in accordance with claim 2 wherein thermal expansion coefficient of said coupling bolt is lower than thermal expansion coefficient of said seal ring, mating flange, and housing.

6. A coupling apparatus in accordance with claim 1 wherein said first seat is a spherical convex seat and said second seat is a spherical concave seat.

7. A coupling apparatus in accordance with claim 1 further comprising a cylindrical pipe and an elbow, said pipe comprising a first end and a second end, said pipe first end coupled to said mating flange and said elbow coupled to said pipe second end.

8. A coupling apparatus in accordance with claim 7 wherein said elbow comprises a draw bolt opening, and wherein said coupling apparatus further comprises a draw bolt extending through said elbow draw bolt opening, and configured to extend through the T-box draw bolt opening to couple said elbow to the core shroud T-box.

9. A coupling apparatus in accordance with claim 8 further comprising an anchor plate having a draw bolt opening configured to be placed inside the core shroud adjacent the T-box and receive said draw bolt.

10. A coupling apparatus in accordance with claim 8 further comprising a block configured to be placed adjacent said elbow and receive said draw bolt.

11. A coupling apparatus for coupling a downcomer pipe of a core spray line to a core shroud in a nuclear reactor, the downcomer pipe including at least one lateral pin opening, the core shroud including a T-box having a draw bolt opening, said apparatus comprising:
    a seal ring having a first seat;
    a mating flange comprising a second seat configured to receive said first seat of said seal ring, and four coupling bolt openings; and
    a housing for securing said first seat on said second seat said housing comprising a substantially cylindrical pipe opening configured to receive a downcommer pipe, four coupling bolt openings substantially aligned with said mating flange coupling bolt openings, four coupling bolts extending through said aligned couping bolt openings, two lateral pin openings configured to substantially align with the downcomer pipe lateral pin openings, said seal ring positioned between said mating flange and said housing, said housing further comprising lateral pins extending through said lateral pin openings and configured to extend through and engage the downcommer pipe lateral pin openings.

12. A coupling apparatus in accordance with claim 11 wherein said mating flange bolt openings are slotted.

13. A coupling apparatus in accordance with claim 11 further comprising at least one spherical washer configured to receive said coupling bolt.

14. A coupling apparatus in accordance with claim 11 wherein a thermal expansion coefficient of each said coupling bolt is lower than a thermal expansion coefficient of said seal ring, mating flange, and housing.

15. A coupling apparatus in accordance with claim 11 wherein said first seat is a spherical convex seat and said second seat is a spherical concave seat.

16. A coupling apparatus in accordance with claim 11 further comprising a cylindrical pipe and an elbow, said pipe comprising a first end and a second end, said pipe first end coupled to said mating flange and said elbow coupled to said pipe second end.

17. A coupling apparatus in accordance with claim 16 wherein said elbow comprises a draw bolt opening, and wherein said coupling apparatus further comprises a draw bolt extending through said elbow draw bolt opening, and configured to extend through the T-box draw bolt opening to couple said elbow to the core shroud T-box.

18. A coupling apparatus in accordance with claim 17 further comprising an anchor plate having a draw bolt opening configured to be placed inside the core shroud adjacent the T-box and receive said draw bolt.

19. A coupling apparatus in accordance with claim 17 further comprising a block configured to be placed adjacent said elbow and receive said draw bolt.

* * * * *